US011874680B2

(12) United States Patent
Saha

(10) Patent No.: US 11,874,680 B2
(45) **Date of Patent: *Jan. 16, 2024**

(54) POWER SUPPLY WITH INTEGRATED VOLTAGE REGULATOR AND CURRENT LIMITER AND METHOD

(71) Applicant: GlobalFoundries U.S. Inc., Malta, NY (US)

(72) Inventor: Shatabda Saha, Radebeul (DE)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,060

(22) Filed: Jan. 13, 2023

(65) Prior Publication Data

US 2023/0161366 A1 May 25, 2023

Related U.S. Application Data

(63) Continuation of application No. 17/374,228, filed on Jul. 13, 2021, now Pat. No. 11,599,133.

(51) Int. Cl.
*G05F 1/575* (2006.01)
*G05F 1/573* (2006.01)

(52) U.S. Cl.
CPC .............. *G05F 1/575* (2013.01); *G05F 1/573* (2013.01)

(58) Field of Classification Search
CPC .......... G05F 1/575; G05F 1/595; G05F 1/614; G05F 1/571; G05F 1/573; G05F 1/565; G05F 1/563
See application file for complete search history.

(56) References Cited

U.S. PATENT DOCUMENTS 6,002,295 A * 12/1999 Gens .......................... G05F 1/59 327/541
7,495,420 B2 2/2009 Vinn
(Continued)

OTHER PUBLICATIONS

Hsieh et al., "A Low-Dropout Regulator With Smooth peak Current Control Topology for Overcurrent Protection," IEEE Transactions on Power Electronics, vol. 25, No. 6, Jun. 2010, pp. 1386-1394.
(Continued)

*Primary Examiner* — Nguyen Tran
(74) *Attorney, Agent, or Firm* — David Cain; Hoffman Warnick LLC

(57) ABSTRACT

Disclosed is a power supply that automatically switches between a voltage regulation mode and an over current protection mode, as needed. The power supply includes a voltage regulator that generates a first control voltage for applying to the control terminal of a pass transistor during a voltage regulation mode to maintain an output voltage at a desired voltage level. The power supply includes a current limiter that generates a second control voltage for applying to the control terminal of the pass transistor during an over current protection mode to prevent an output current from rising above a maximum output current limit. The power supply includes additional circuitry that detects when over current protection is required and automatically switches the control voltage applied to the control terminal from the first control voltage to the second control voltage or vice versa, as necessary. Also disclosed is an associated power supply method.

20 Claims, 6 Drawing Sheets

(56) References Cited

U.S. PATENT DOCUMENTS

| | | | | |
|---|---|---|---|---|
| 7,622,902 | B1 | 11/2009 | Kao et al. | |
| 9,755,428 | B2 | 9/2017 | Witcher et al. | |
| 2006/0170401 | A1 | 8/2006 | Chen et al. | |
| 2009/0009004 | A1* | 1/2009 | Fujiwara | H02M 3/07 307/80 |
| 2009/0322295 | A1 | 12/2009 | Scoones et al. | |
| 2010/0090665 | A1 | 4/2010 | Jian | |
| 2010/0156379 | A1 | 6/2010 | Marino et al. | |
| 2012/0176112 | A1 | 7/2012 | Singh et al. | |
| 2012/0313609 | A1 | 12/2012 | Fukumura | |
| 2014/0139029 | A1* | 5/2014 | Gasparini | G06F 1/26 307/80 |
| 2021/0124383 | A1 | 4/2021 | Iguchi et al. | |

OTHER PUBLICATIONS

King et al., "Advantages of using PMOS-type low-dropout linear regulators in battery applications," Power Management, Texas Instruments Incorporated, Analog and Mixed Signal Projects: Analog Applications Journal, Aug. 2000, pp. 16-21.
Pérez-Bailón et al., "A Power Efficient LDO Regulator for Portable CMOS SoC Measurement Systems," IEEE 2017, 6 pages.
Torres et al., "LDO Basics: Current Limit," TLV71P, 2017, https://e2e.ti.com/blogs_/b/powerhouse/posts/ldo-current-limit, pp. 1-4.
U.S. Appl. No. 14/374,228, Notice of Allowance dated Dec. 7, 2022, 9 pages.

* cited by examiner

POWER SUPPLY WITH INTEGRATED VOLTAGE REGULATOR AND CURRENT LIMITER AND METHOD

BACKGROUND

Field of the Invention

The present invention relates to power supply and, more particularly, to embodiments of a power supply with integrated voltage regulator and current limiter and an associated method.

Description of Related Art

A power supply is a device that supplies power to an electrical load. A voltage-regulated power supply automatically maintains an output voltage at a desired voltage level, as long as a maximum output current limit is not exceeded. A current limiter (also referred to herein as a current limiting circuit or over current protection circuit) can be employed to avoid exceeding the maximum output current limit. Typically, such a current limiter is configured to create a copy of the actual output current, to compare the copied current to a reference current, and to subsequently limit the output current based on the difference between the copied current and the reference current. Unfortunately, current limiters with this configuration are not ideal because, for example, they tend to exhibit higher quiescent currents and higher losses with increasing load currents, and they often require fast loop correction to create the copied current.

SUMMARY

Disclosed herein are embodiments of a power supply configured to automatically switch between operating in a voltage regulation mode and an over current protection mode, as needed. The power supply can include an input voltage node and an output voltage node. The pass transistor can have an input terminal connected to the input voltage node for receiving an input voltage; an output terminal connected to the output voltage node for outputting an output voltage; and a control terminal. The power supply can further include a voltage regulator, which is configured to generate and output a first control voltage for applying to the control terminal of the pass transistor during a voltage regulation mode in order to maintain the output voltage at the output voltage node at a desired voltage level. This first control voltage can be variable and specifically generated based on the output voltage at the output voltage node. The power supply can further include a current limiter, which is configured to generate and output a second control voltage for applying to the control terminal of the pass transistor during an over current protection mode to prevent an output current from rising above a maximum output current limit of the pass transistor.

The power supply can further include additional circuitry for detecting when over current protection is required (e.g., due to excess load) and for automatically switching operation between the voltage regulation mode and the over current protection mode (i.e., for automatically switching the control voltage applied to the control terminal from the first control voltage to the second control voltage or vice versa), as necessary. More specifically, the power supply can further include a comparator, which is configured to compare the first control voltage to the second control voltage and to output a select signal with a logic value that depends on the difference between the first control voltage and the second control voltage. The power supply can further include a switching circuit, which is configured to selectively and automatically apply either the first control voltage or the second control voltage to the control terminal of the pass transistor depending upon the logic value of the select signal. For example, the comparator can output a select signal with a first logic value indicating that over current protection is not required. In this case, the switching circuit can apply the first control voltage from the voltage regulator to the control terminal of the pass transistor, either maintaining the power supply in or switching the power supply to the voltage regulation mode. Alternatively, the comparator can output a select signal with a second logic value indicating that over current protection is required. In this case, the switching circuit can apply the second control voltage from the current limiter to the control terminal of the pass transistor, maintaining the power supply in or switching the power supply to the over current protection mode.

As discussed further in the detailed description section below, optionally, the current limiter can also be configured to automatically adjust the second control voltage so that it is at a first voltage level during the voltage regulation mode and so that it is at a slightly different second voltage level during the over current protection mode in order to prevent continuous oscillation between the two modes.

Also disclosed herein are embodiments of a power supply method. The method can include supplying, by a pass transistor of a power supply, power to an electrical load. supplying, by a pass transistor of a power supply, power to an electric load. The pass transistor can have an input terminal that is connected to an input voltage node; an output terminal connected to an output voltage node; and a control terminal. The method can further include generating and outputting, by a voltage regulator of the power supply, a first control voltage for applying to the control terminal of the pass transistor during a voltage regulation mode in order to maintain an output voltage at the output voltage node at a desired voltage level. This first control voltage can be variable and specifically generated based on the output voltage at the output voltage node. The method can further include generating and outputting, by a current limiter of the power supply, a second control voltage for applying to the control terminal of the pass transistor during an over current protection mode to prevent an output current from rising above a maximum output current limit of the pass transistor.

The method can further include detecting when over current protection is required (e.g., due to excess load) and automatically switching operation between the voltage regulation mode and the over current protection mode (i.e., for automatically switching the control voltage applied to the control terminal from the first control voltage to the second control voltage or vice versa), as necessary. More specifically, the method can include comparing, by a comparator of the power supply, the first control voltage to the second control voltage and outputting, by the comparator, a select signal with a logic value that depends on the difference between the first control voltage and the second control voltage. The method can further include selectively and automatically applying, by a switching circuit of the power supply, either the first control voltage or the second control voltage to the control terminal of the pass transistor depending upon the logic value of the select signal. For example, if the select signal has a first logic value indicating that over current protection is not required, then the method can include applying the first control voltage from the voltage regulator to the control terminal of the pass transistor, either maintaining the power supply in or switching the power supply to the voltage regulation mode. Alternatively, if the select signal has a second logic value indicating that over current protection is required, then the method can include applying the second control voltage from the current limiter to the control terminal of the pass transistor, maintaining the power supply in or switching the power supply to the over current protection mode.

As discussed further in the detailed description section below, optionally, the method can include automatically adjusting the second control voltage so that it is at a first voltage level during the voltage regulation mode and so that it is at a slightly different second voltage level during the over current protection mode in order to prevent continuous oscillation between the two modes.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

As mentioned above, a power supply is a device that supplies power to an electrical load. A voltage-regulated power supply automatically maintains the output voltage at a desired voltage level, as long as a maximum output current limit is not exceeded. A current limiter (also referred to herein as a current limiting circuit or over current protection circuit) can be employed to avoid exceeding the maximum output current limit. Typically, such a current limiter is configured to create a copy of the actual output current, to compare the copied current to a reference current, and to subsequently limit the output current based on the difference between the copied current and the reference current. Unfortunately, current limiters with this configuration are not ideal because, for example, they tend to exhibit higher quiescent currents and higher losses with increasing load currents, and they often require fast loop correction to create the copied current.

In view of the foregoing, disclosed herein are embodiments of a power supply, which has both an integrated voltage regulator and an integrated current limiter and which is configured to automatically switch between operating in a voltage regulation mode and an over current protection mode, as needed. Specifically, the power supply includes a voltage regulator, which generates a first control voltage for applying to the control terminal of a pass transistor during a voltage regulation mode in order to maintain an output voltage at an output voltage node at a desired voltage level. The power supply also includes a current limiter, which generates a second control voltage for applying to the control terminal of the pass transistor during an over current protection mode to prevent the output current from rising above the maximum output current limit of the pass transistor. Finally, the power supply includes additional circuitry for detecting when over current protection is required (e.g., due to excess load) and for automatically switching between the voltage regulation mode and the over current protection mode (i.e., for automatically switching the control voltage applied to the control terminal from the first control voltage to the second control voltage or vice versa), as necessary. Also disclosed herein are associated power supply method embodiments.

Figure 1:
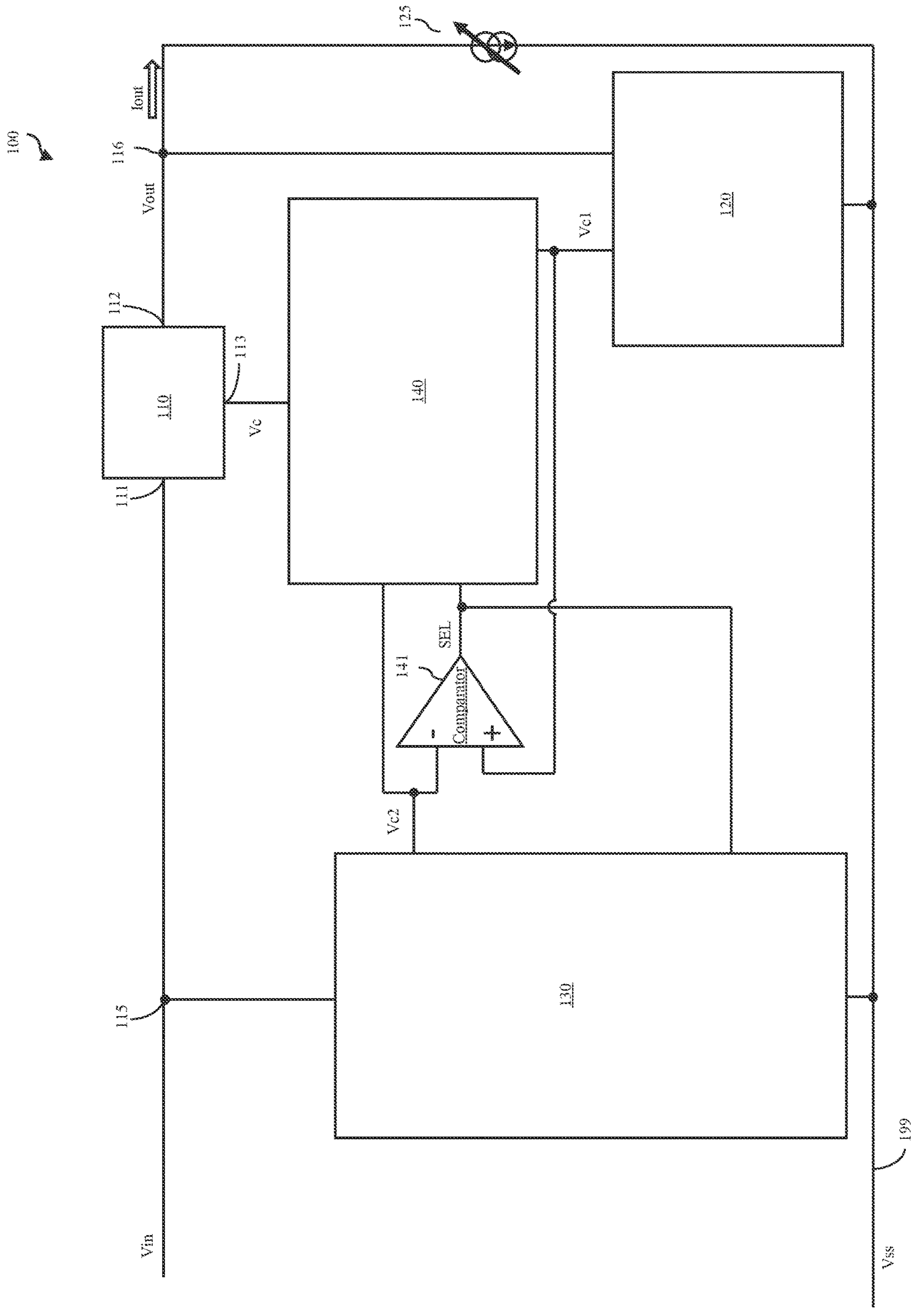
FIG. 1 is a schematic diagram illustrating generally embodiments of a power supply, as disclosed herein, with both an integrated voltage regulator and an integrated current limiter.

As illustrated in FIG. 1, each of the power supply 100 embodiments disclosed herein can include an input voltage node 115; an output voltage node 116; and a pass transistor 110 connected between the input voltage node 115 and the output voltage node 116. Specifically, pass transistor 110 can have an input terminal 111 connected to the input voltage node 115 for receiving a fixed input voltage (Vin); an output terminal 112 connected to the output voltage node 116 for outputting an output voltage (Vout); and a control terminal for receiving a control voltage that controls current flow through the pass transistor 110.

The power supply 100 can further include a voltage regulator 120, which generates and outputs (i.e., is configured to generate and output) a first control voltage (Vc1) for applying to the control terminal 113 of the pass transistor 110 during a voltage regulation mode, thereby controlling the current flow through the pass transistor 110 so that Vout at the output voltage node 116 is maintained at a desired voltage level. Vc1 can be generated by the voltage regulator 120 given the fixed Vin and based on the actual Vout at the output terminal 112. Vc1 can further be variable and continuously adjusted by the voltage regulator 120, changing with any changes in the actual Vout (e.g., changing with temperature-dependent changes in Vout) so that the voltage level of Vout is continuously brought back to the desired voltage level. However, those skilled in the art will recognize that at output currents (Iout) (also referred to herein as load currents (Iload)) above a maximum output current limit (Iout-max) (also referred to herein as Iload-max) for the pass transistor 110, the voltage regulator 120 may not be able to maintain the desired output voltage. That is, if Iout-max is exceeded, then the Vc1 generated by the voltage regulator 120 may not be sufficient to maintain Vout at the desired voltage level.

Therefore, the power supply 100 can further include a current limiter 130, which generates and outputs (i.e., is configured to generate and output) a second control voltage (Vc2) for applying to the control terminal 113 of the pass transistor 110 during an over current protection mode in order to prevent the output current (Iout) from rising above Iout-max. Vc2 can be generated and output by the current limiter 130 so that, for example, it is approximately equal to what Vc1 would be if generated by the voltage regulator 120 when Iout is just at, but not exceeding, Iout-max.

The power supply 100 can also include additional circuitry for detecting when over current protection is required (e.g., due to excess load) and for automatically switching between the voltage regulation mode and the over current protection mode (i.e., for automatically switching the control voltage applied to the control terminal 113 of pass transistor 110 from Vc1 to Vc2 or vice versa), as necessary. Specifically, the power supply 100 can further include a comparator 141, which compares (i.e., is configured or adapted to compare) Vc1 to Vc2 and generates and outputs (i.e., is configured to generate and output) a select signal (SEL) having a logic value that is based on the difference between Vc1 and Vc2. The power supply 100 can further include a switching circuit 140, which selectively and automatically applies (i.e., is configured to selectively and automatically apply) either Vc1 or Vc2 to the control terminal 113 of the pass transistor 110 depending upon the logic value of SEL. For example, the comparator 141 can generate and output SEL with a first logic value indicating that over current protection is not required. In this case, the switching circuit 140 can apply Vc1 from the voltage regulator 120 to the control terminal 113 of the pass transistor 110, either maintaining the power supply 100 in or switching the power supply 100 to the voltage regulation mode. Alternatively, the comparator 141 can generate and output SEL with a second logic value indicating that over current protection is required. In this case, the switching circuit 140 can apply Vc2 from the current limiter 130 to the control terminal 113 of the pass transistor 110, maintaining the power supply 100 in or switching the power supply 100 to the over current protection mode.

Figure 2:
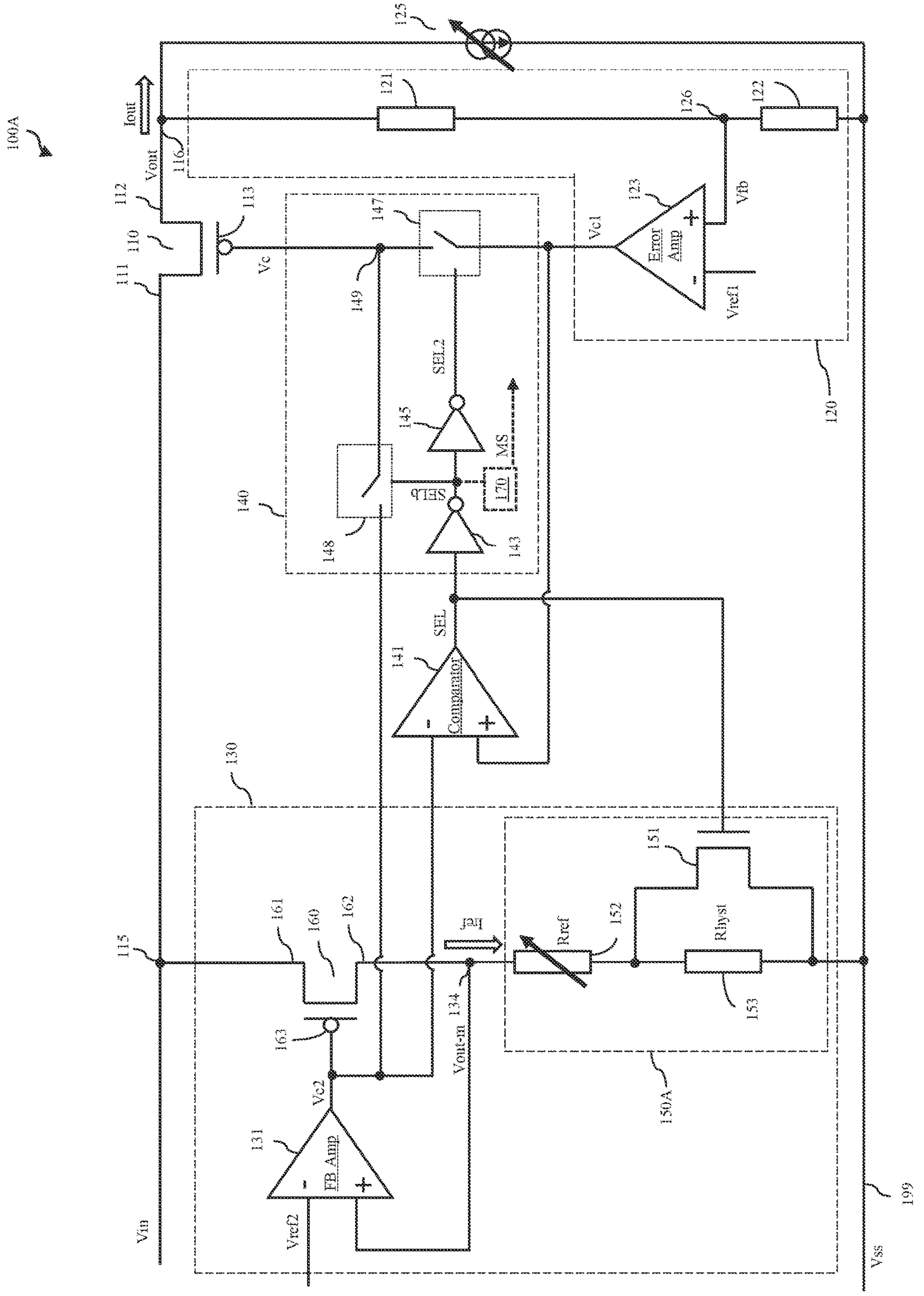
FIG. 2 is a schematic diagram illustrating, more specifically, an exemplary embodiment of the disclosed power supply.
Figure 3:
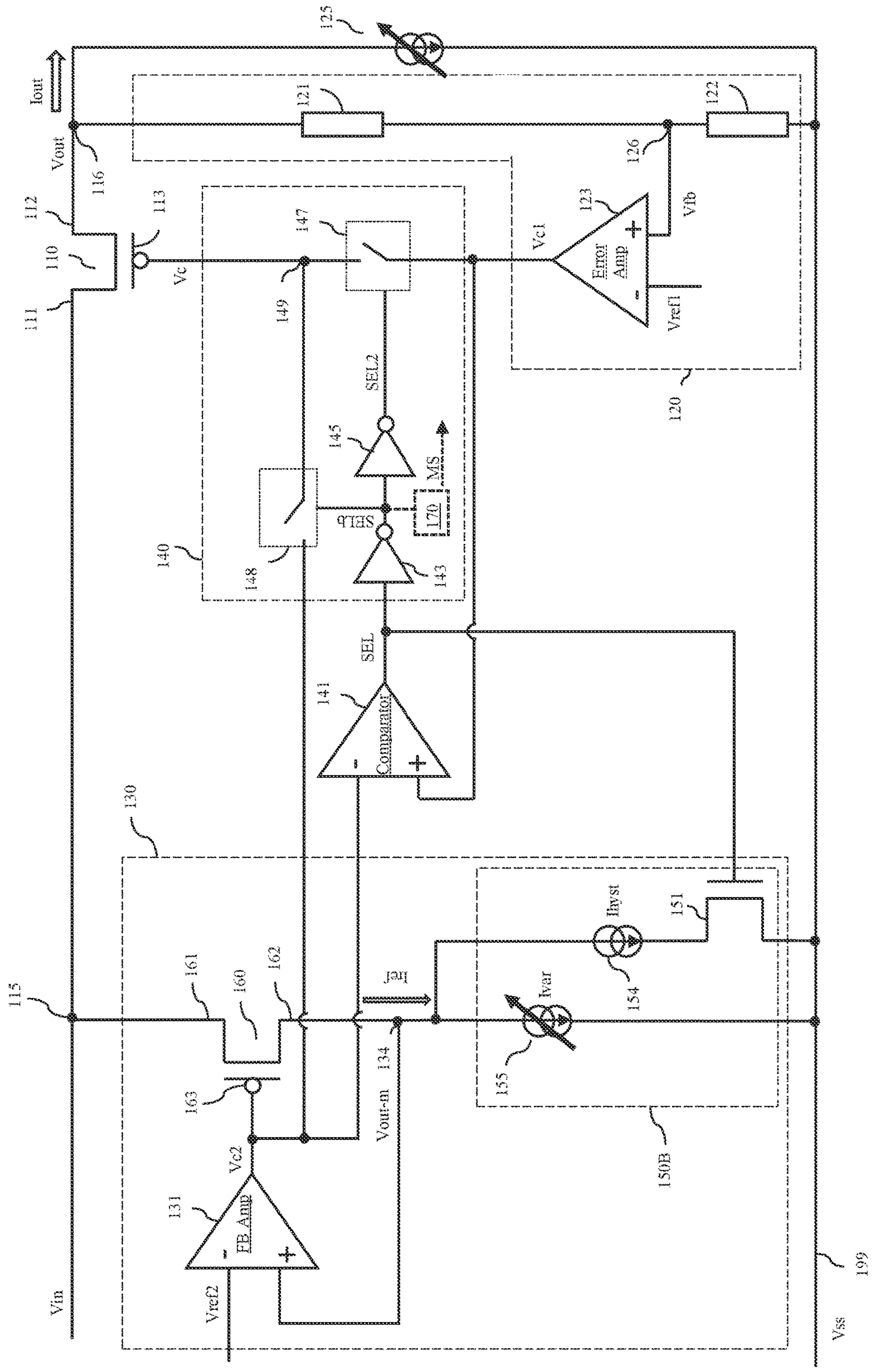
FIG. 3 is a schematic diagram illustrating, more specifically, another exemplary embodiment of the disclosed power supply.

FIGS. 2 and 3 are schematic diagrams illustrating, in greater detail, two exemplary embodiments of such a power supply 100A and 100B, respectively.

Referring to FIGS. 2 and 3, the power supply 100A, 100B can include a pass transistor 110, which supplies power to an electrical load 125 (e.g., a variable electrical load). That is, the power supply 100A, 100B can include an input voltage node 115; an output voltage node 116 connected to the electric load 125; and a pass transistor 110 connected between the input voltage node 115 and the output voltage node 116. The pass transistor 110 can have an input terminal 111, which receives a fixed input voltage (Vin). The pass transistor 110 can further have a control terminal 113, which receives a control voltage (Vc) (see discussion below). The pass transistor 110 can further have an output terminal 112, which outputs an output voltage (Vout) the voltage level of which is dependent upon both Vin and Vc.

The pass transistor 110 can be, for example, a p-type transistor. The p-type transistor can be a p-type field effect transistor (PFET), as illustrated. Such a power supply PFET can include a channel region between a source region (i.e., the input terminal) and a drain region (i.e., the output terminal) and a gate (i.e., the control terminal) adjacent to the channel region. Alternatively, the p-type transistor can be a pnp bipolar junction transistor (pnp-BJT). Such a power supply pnp-BJT can include a base region (i.e., the control terminal) between an emitter region (i.e., the input terminal) and a collector region (i.e., the output terminal). Alternatively, the pass transistor 110 can be any other suitable type of pass transistor.

The power supply 100A, 100B can further include a voltage regulator 120. The voltage regulator 120 can be a low-dropout voltage regulator and, particularly, a DC linear voltage regulator that regulates (i.e., that is configured to regulate) Vout at the output voltage node 116 even when the fixed Vin at the input voltage node 115 is very close to Vout. More specifically, the voltage regulator 120 generates (i.e., is configured to generate) a first control voltage (Vc1) for automatically maintaining Vout at a desired voltage level during a voltage regulation mode, as long Vin remains fixed and the maximum output current limit (Iout-max) of the pass transistor 110 is not exceeded.

In some embodiments, this voltage regulator 120 can include a pair of resistors 121 and 122 and an error amplifier 123 (also referred to herein as a differential amplifier). The pair of resistors 121-122 can be connected in series between the output voltage node 116 and ground (Vss) 199. The error amplifier 123 can include an inverting input (−) that receives a first reference voltage (Vref1). Vref1 can be a constant reference voltage (i.e., a temperature-independent reference voltage set at a predetermined voltage level). Vref1 can, for example, be generated by and received from a bandgap reference circuit. Such bandgap reference circuits are well known in the art and, thus, the details have been omitted from this specification in order to allow the reader to focus on the salient aspects of the disclosed embodiments. The error amplifier 123 can also include a non-inverting input (+) connected to a feedback voltage node 126 at an interface between the pair of series-connected resistors 121-122. Thus, the non-inverting input (+) can monitor, at the feedback voltage node 126, a fraction of Vout (referred to herein as the feedback voltage (Vfb)). Vfb can be determined by the resistor ratio of the two resistors 121-122 as follows:

$$Vout=Vfb*(1+R1/R2), \tag{1}$$

where R1 is a first resistance of the first resistor 121 and R2 is a second resistance of the second resistor 122. The error amplifier 123 can further have an output and can be generate and output (i.e., can be configured to generate and output) Vc1 at the output based on the difference between Vfb and Vref1. Specifically, the generated and output Vc1 will be equal to the difference between Vref1 and Vfb times any gain. Additionally, it should be noted that as Vfb rises above Vref1, Vc1 will become increasingly more positive until a positive saturation voltage is reached, whereas as Vfb drops below Vref1, Vc1 will become increasingly more negative until a negative saturation voltage is reached. As mentioned above and discussed in greater detail below, Vc1 can be selectively applied to the control terminal 113 of the pass transistor 110 during a voltage regulation mode in order to maintain Vout at the output voltage node 116 at a desired voltage level. However, as discussed above, when Tout rises above Iout-max for the pass transistor 110, the voltage regulator 120 may not be able to maintain Vout at the desired voltage level. That is, the Vc1 generated by the voltage regulator 120 may not be sufficient to maintain Vout at the desired voltage level.

Therefore, the power supply 100A, 100B can further include a current limiter 130, which generates and outputs (i.e., is configured to generate and output) a second control voltage (Vc2) for applying to the control terminal 113 of the pass transistor 110 during an over current protection mode in order to prevent the output current (Tout) from rising above Iout-max. Vc2 can be generated and output by the current limiter 130 so that, for example, it is approximately equal to what the Vc1 would be if generated by the voltage regulator 120 when Tout is just at, but not exceeding, the Iout-max.

In some embodiments, the current limiter 130 can include at least a mimicking transistor 160 and a feedback amplifier 131, and a reference current generation circuit (e.g., 150A or 150B, as discussed in greater detail below).

The mimicking transistor 160 can be a p-type mimicking transistor and can specifically be an additional instance of the same transistor used for the pass transistor 110. Alternatively, the mimicking transistor 160 could be a scaled down version of the pass transistor 110. For example, for PFET pass and mimicking transistors, the PFET mimicking transistor can have a channel length (L) and a channel width (W), whereas the PFET pass transistor can have the same channel length (L), but a channel width of (K*W). Since, for purposes of illustration, the pass transistor 110 is shown as being a PFET, the mimicking transistor 160 is similarly shown as being a PFET. In any case, the mimicking transistor 160, an output terminal 162 and a control terminal 163. The input terminal 161 of the mimicking transistor 160 can be connected to the voltage input node 115 such that it too receives the input voltage (Vin). The output terminal 162 of the mimicking transistor 160 can be connected to a mimic output voltage node 134.

The reference current (Tref) generation circuit can be connected between the mimic output voltage node 134 and ground. The Tref generation circuit can generate (i.e., can be configured to generate) a specific Tref across the mimic output voltage node 134 and, thereby setting the mimic output voltage (Vout-m) at the mimic output voltage node 134.

Figure 4:
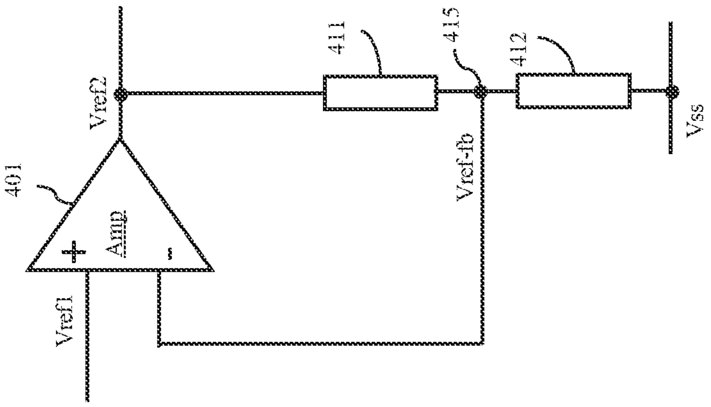
FIG. 4 is a schematic diagram illustrating an exemplary reference voltage generation circuit for generating the second reference voltage (Vref2) for use in the disclosed power supply.

The feedback amplifier 131 can include a non-inverting (+) input, which is connected to the mimic output voltage node 134. The feedback amplifier 131 can also include an inverting (−) input that receives a second reference voltage (Vref2). This Vref2 can be received, for example, from a reference voltage generation circuit that is configured to generate Vref2 based on Vref1 and such that it is independent of Vout but mimics Vout of the pass transistor 110 at Iout-max. FIG. 4 is a schematic diagram illustrating an exemplary reference voltage generation circuit that can be employed to generate Vref2, as described. Specifically, the reference voltage generation circuit can include an amplifier 401 with a pair of inputs and an output. A pair of reference resistors 411-412 can be connected in series between the output of the amplifier 401 and ground (Vss) 199 (e.g., a ground rail). The reference resistors 411-412 can be essentially the same as the resistors 121-122 used in voltage regulator 120 with the first reference resistor 411 having the same first resistance (R1) as the first resistor 121 and with the second reference resistor 412 having the same second resistance (R2) as the second resistor 122. One input of the amplifier 401 can receive Vref1 and the other input of the amplifier 401 can receive a reference feedback voltage (Vref-fb) from a reference feedback voltage node 415 at an interface between the two reference resistors 411-412. It should be noted that Vref-fb can be essentially the same as Vfb on the feedback voltage node 126 of the voltage regulator 120. Based on the difference between Vref1 and Vref-fb and further on any gain, the amplifier 401 can output Vref2. Given equation (1) above, given that the reference resistors 411-412 are the same as the resistors 121-122, given that Vref-fb is essentially the same as Vfb, and further given the following equations that define Vref2, it should be understood that the relationship of Vout to Vref1 will be essentially the same as the relationship of Vref2 to Vref1 and, thus, Vref2 will be essentially the same as but independent from Vout as long as the maximum output current limit (Iout-max) of the pass transistor 110 has not been exceeded.

$$Vref2 = Vref\text{-}fb*(1+R1/R2), \quad (2)$$

$$Vref2 = Vref1*(1+R1/R2), \quad \text{and } (3)$$

$$Vref2 = Vout \text{ when } Iout < Iout\text{-max}. \quad (4)$$

Referring again to FIGS. 2 and 3, the feedback amplifier 131 of the current limiter 130 can further have an output and can generate and output (i.e., can be configured to generate and output) Vc2 at the output based on the difference between Vref2 and the mimic output voltage (Vout-m) at the mimic output voltage node 134. With this configuration, Vc2 can be set, for example, so that it is approximately equal to what the Vc1 would be if generated by the voltage regulator 120 when Iout is just at, but not exceeding, Iout-max. This Vc2 can be continuously applied to the control terminal 163 of the mimicking transistor 160 so that the current density through the mimicking transistor 160 is essentially the same as the current density through the pass transistor 110 at Iout-max. Additionally, during an over current protection mode, Vc2 can be selectively applied to the control terminal 113 of the pass transistor 110 to prevent the output current at the output terminal 112 from rising above Iout-max.

The power supply 100A, 100B can also include additional circuitry for detecting when over current protection is required (e.g., due to excess load) and for automatically switching between the voltage regulation mode and the over current protection mode (i.e., for automatically switching the Vc applied to the control terminal 113 of pass transistor 110 from Vc1 to Vc2 or vice versa), as necessary. Specifically, the power supply 100A, 100B can further include a comparator 141, which continuously compares (i.e., is configured to continuously compare) Vc1 from the voltage regulator 120 to Vc2 from the current limiter 130 and which outputs (i.e., is configured to output) a select signal (SEL) having a logic value that is based on the difference between Vc1 and Vc2.

The power supply 100A, 100B can further include a switching circuit 140, which selectively and automatically applies (i.e., is configured to selectively and automatically apply) either Vc1 or Vc2 to the control terminal 113 of the pass transistor 110 depending upon the logic value of SEL. In some embodiments, the switching circuit 140 can include a pair of series-connected inverters (i.e., a first inverter 143 and a second inverter 145 connect in series). The first inverter 143 can receive, as an input, SEL from the comparator 141. The switching circuit can further include a pair of switches (i.e., a first switch 147 and a second switch 148). The second switch 148 can receive and be controlled by an inverted select signal (SELb) output from the first inverter 143 and, depending upon the logic value of SELb, can connect the output of the feedback amplifier 131 of the current limiter 130 to a control node 149 and thereby to the control terminal 113 of the pass transistor 110 (i.e., can cause Vc2 to be applied to the control terminal 113) or, alternatively, can disconnect the output of the feedback amplifier 131 from the control node 149. The first switch 147 can receive and be controlled by a twice-inverted select signal (SEL2) from the second inverter 145 and, based on SEL2, can connect the output of the error amplifier 123 of the voltage regulator 120 to the control node 149 and thereby to the control terminal 113 of the pass transistor 110 (i.e., can cause Vc1 to be applied to the control terminal 113) or, alternatively, can disconnect the output of the error amplifier 123 from the control node 149. With this configuration, either Vc1 or Vc2 is applied to the control terminal 113 of the pass transistor 110 at any given time but not both.

Figure 5:
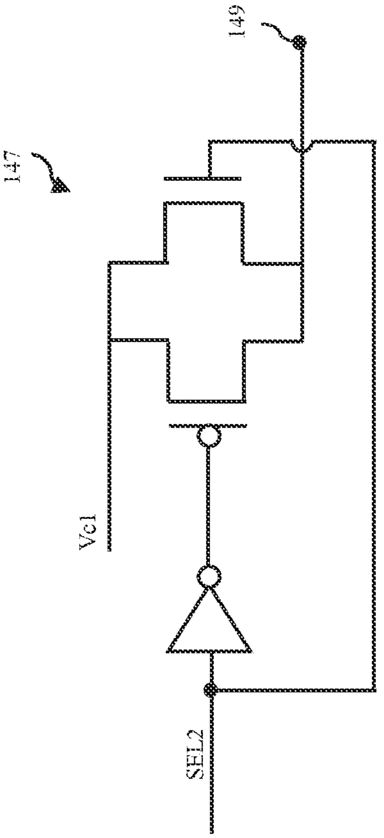
FIGS. 5 and 6 are schematic diagrams illustrating exemplary switches that can be incorporated into the disclosed power supply.
Figure 6:
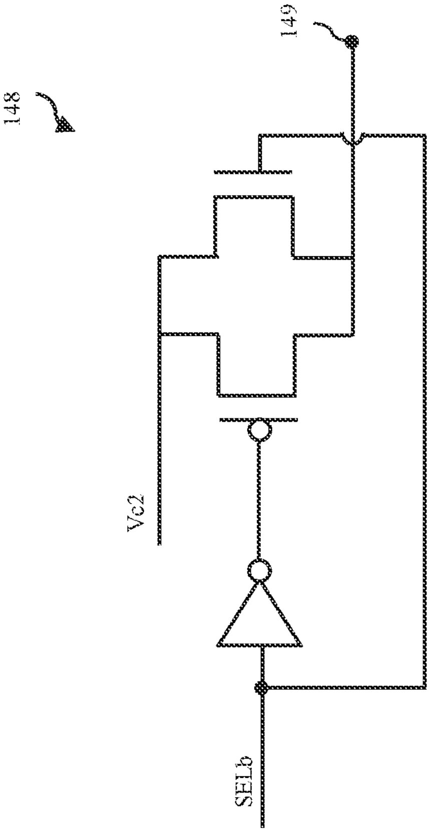

FIGS. 5 and 6 are schematic diagrams illustrating an exemplary first switch 147 and an exemplary second switch 148, respectively, that can be incorporated into the switching circuit 140 for selectively and alternatively applying either Vc1 or Vc2 to the control terminal 113 of the pass transistor 110. Each of these switches 147 and 148 can include a p-type field effect transistor and an n-type field effect transistor connected in parallel between an input node (which receives a control voltage, for example, Vc1 in the case of the first switch 147 and Vc2 in the case of the second switch 148) and the control node 149. Each of these switches 147 and 148 can further include an additional inverter with an output connected to the gate of the p-type field effect transistor. In the first switch 147, the twice-inverted select signal (SEL2) is applied to the gate of the n-type field effect transistor and also to the input of the additional inverter such that a thrice-inverted select signal is applied to the gate of the p-type field effect transistor. In the second switch 148, the inverted select signal (SELb) is applied to the gate of the n-type field effect transistor and also to the input of the additional inverter such that another twice-inverted select signal is applied to the gate of the p-type field effect transistor.

With this configuration, if the logic value of SEL from the comparator 141 is a 1 (i.e., indicating that Vc1 is greater than Vc2 and over current protection is not needed), then both the p-type field effect transistor and the n-type field effect transistor of the first switch 147 will be turned on and Vc1 will be applied to the control terminal 113 of the pass transistor 110, whereas both the p-type field effect transistor and the n-type field effect transistor of the second switch 148 will be turned off and Vc2 will not be applied to the control terminal 113 of the pass transistor 110. As a result, the power supply 100A, 100B either continues to operate in the voltage regulation mode (if already operating in the voltage regulation mode) or switches back to operating in the voltage regulation mode. However, if the logic value of the SEL from the comparator 141 is a 0 (i.e., indicating that Vc1 is less than Vc2 and over current protection is needed), both the p-type field effect transistor and the n-type field effect transistor of the first switch 147 will be turned off and Vc1 will not be applied to the control terminal 113 of the pass transistor 110, whereas both the p-type field effect transistor and the n-type field effect transistor of the second switch 148 will be turned on and Vc2 will be applied to the control terminal 113 of the pass transistor 110. Thus, the power supply 100A, 100B either switches to operating in the current protection mode or continues operating in the over current protection mode (if already operating in the over current protection mode).

As mentioned above, the Iref generation circuit can optionally be a variable Tref generation circuit (e.g., see the variable Tref generation circuit 150A of the current limiter 130 in the power supply 100A of FIG. 2, see also the variable Tref generation circuit 150B of the current limiter 130 in the power supply 100B of FIG. 3). Such a variable Tref generation circuit 150A, 150B automatically adjust (i.e., can be configured to automatically adjust) Tref across the mimic output voltage node 134 so that, during operation in a voltage regulation mode, Tref is at a first current level (Iref-vrm) causing Vc2 to be at a first voltage level (Vc2-vrm) and so that, during operation in an over current protection mode, the Tref is at a second current level (Iref-ocpm) causing Vc2 to be at a second voltage level (Vc2-ocpm) that is different from the first voltage level. Specifically, the Tref generation circuit automatically adjust (i.e., can be configured to automatically adjust) Iref so that when the power supply 100A, 100B is operating in the voltage regulation mode Vc2 is set at a first voltage level (Vc2-vrm) that is approximately equal to what the Vc1 would be if generated by the voltage regulator 120 when Tout is just at, but not exceeding, the Iout-max. Thus, in the voltage regulation mode Vc1 will be greater than Vc2. However, as mentioned above, Vc1 is variable, and it will decrease as Tout increases until the load reaches Iout_max. As soon as Vc1 drops below Vc2, the comparator 141 will cause SEL to switch from a logic value of 1 to a logic value of 0, thereby switching operation of the power supply 100A, 100B to the over current protection mode. During the over current protection mode, Vc2 will be applied to the control terminal 113 of the pass transistor as long as Vc1 is below Vc2. However, if Vc2 is kept at the same voltage level during both the voltage regulation mode and the over current protection mode, the power supply 100A, 100B could automatically switch back to the voltage regulation mode as soon as Vc2 is applied to the control terminal 113 of the pass transistor 110, automatically switch back to the over current protection mode as soon as Vc1 is applied to the control terminal 113, and so on. To prevent this continuous oscillation between the two modes, the variable Tref generation circuit 150A, 150B can be used to automatically adjust the current level of Tref so that it is less in the over current protection mode (i.e., so that, during operation in the voltage regulation mode, Iref is at a first current level (Tref-vrm) and so that, during operation in the over current protection mode, Tref is at a second current level (Iref-ocpm) that is less than the first current level). Thus, during operation in the voltage regulation mode, Vc2 will be at a first voltage level (Vc2-vrm) and, during operation in the overcurrent protection mode, Vc2 will be at a second voltage level (Vc2-ocpm) that is higher than the first voltage level. As a result, before the power supply 100A, 100B can switch from the over current protection mode back to the voltage regulation mode, Vc1 will have to be pulled up higher than it otherwise would. That is, Vc1 only has to drop below Vc2-vrm to cause the switch to operation in the over current protection mode, but it will have to rise to at least Vc2-ocpm (i.e., Vc1≥Vc2-ocpm) to trigger a switch back to operation in the voltage regulation mode.

For example, as illustrated in FIG. 2, in some embodiments the variable Tref generation circuit 150A can include a resistor 152 (e.g., a variable resistor) connected to the mimic output voltage node 134. The variable Tref generation circuit 150A can further include an additional resistor 153 (also referred to herein as a hysteresis resistor) connected in series between the resistor 152 and ground (Vss) 199. The variable Tref generation circuit 150A can further including an NFET 151, which is connected in parallel with the additional resistor 153 and further connected in series between the resistor 152 and ground (Vss) 199. The NFET 151 can have a gate connected to the output of the comparator 141 such that it is controlled by SEL. In this case, when SEL has a logic value of 1 (i.e., indicating that over current protection is not needed), then the NFET 151 will be in an on-state and current will flow through the resistor 152 and the NFET 151 to ground (e.g., effectively bypassing the additional resistor 153) such that, during operation in the voltage regulation mode, Tref is at the first current level (Iref-vrm) and Vc2 is at the first voltage level (Vc2-vrm). However, when SEL has a logic value of 0 (i.e., indicating that over current protection is needed), then the NFET 151 will be switched to an off-state preventing current flow through the NFET 151. Thus, during the operation in the over current protection mode, current will have to flow through both the resistor 152 and the additional resistor 153 to ground and Tref will drop to the second current level (Iref-ocpm), thereby causing Vc2 to rise to the second voltage level (Vc2-ocpm). It should be noted that for the variable Tref generation circuit 150A, the following equations apply.

$$Iref\text{-}vrm = Vout\text{-}m/Rref, \text{ and} \quad (5)$$

$$Iref\text{-}ocpm = Vout\text{-}m/(Rref+Rhyst), \quad (6)$$

where Vout-m is the is the mimic output voltage on the mimic output voltage node 134, Rref is the resistance of the resistor 152, and Rhyst is the resistance of the additional resistor 153.

In other embodiments, as illustrated in FIG. 3, the variable Tref generation circuit 150B can include a current source 155 (e.g., a variable current source) connected between the mimic output voltage node 134 and ground (Vss) 199. The variable Tref generation circuit 150B can further include an additional current source 154 (also referred to herein as a hysteresis current source) that is also connected to the mimic output voltage node 134 and that is smaller than the current source 155. The variable Tref generation circuit 150B can further include an n-type field effect transistor (NFET) 151 (also referred to herein as a hysteresis on/off switch) connected in series between the additional current source 154 and ground (Vss) 199. The NFET 151 can have a gate connected to the output of the comparator 141 such that it is controlled by SEL. In this case, when SEL has a logic value of 1 (i.e., indicating that over current protection is not needed), then the NFET 151 will be in an on-state and current will flow through the additional current source 154 and the NFET 151 to ground such that Iref in the voltage regulation mode (Iref-vrm) is at the first current level and Vc2 is at the first voltage level (Vc2-vrm). However, when SEL has a logic value of 0 (i.e., indicating that over current protection is needed), then the NFET 151 will be switched to an off-state preventing current flow from the additional current source 154 through the NFET 151. Thus, current will flow only through the current source 155 to ground and Iref in the overcurrent protection mode (Iref-ocpm) will drop to the second current level, thereby causing Vc2 to rise to the second voltage level (Vc2-ocpm). It should be noted that for the variable Iref generation circuit 150B, the following equations apply.

$$I\text{ref-}vrm = I\text{var} + I\text{hyst}, \quad \text{and} \quad (7)$$

$$I\text{ref-}ocpm = I\text{var}, \quad (8)$$

where Ivar is current through the current source 155 and Ihyst is the current through the additional current source 154.

It should be noted that the variable Iref generation circuit 150A, 150B can be configured so that the difference between the first voltage level of Vc2 during the voltage regulation mode (i.e., Vc2-vrm) and the second voltage level of Vc2 during the over current protection mode (i.e., Vc2-ocpm) is relatively small. For example, Vc2-vrm can be on the order of a few millivolts (mV) or even less than 1 mV less than Vc2-ocpm. It should further be noted that this relatively small increase in Vc2 that occurs upon entry into the over current protection mode will result in a corresponding relatively small drop in Iout.

Referring again to FIGS. 2 and 3, optionally, the switching circuit 140 can further include at least one status monitor (e.g., at least one buffer). Each status monitor can monitor (i.e., can be configured to monitor) the on/off state of a corresponding one of the switches 147 and 148 and can output (i.e., can be configured to output) a status signal indicating the state of the switch and, thereby the mode of operation of the power supply 100A, 100B. For purposes of illustration, a single status monitor 170 is shown as being connected to the output of the first inverter 143. This status monitor 170 can, for example, receive (i.e., can be configured to receive) SELB from the first inverter 143 and can output (i.e., can be configured to output) a mode status signal (MS) with a logic value that indicates whether or not the second switch 148 is on or off and, thereby whether or not the power supply 100A, 100B is operating in the over current protection mode. It should be understood that, additionally or alternatively, such a status monitor could be connected to the output of the second inverter 145 and can receive (i.e., can be configured to receive) SEL2 from the second inverter 145 and can output (i.e., can be configured to output) a mode status signal with a logic value that indicates whether or not the first switch 147 is on or off and, thereby whether or not the power supply 100A, 100B is operating in the voltage regulation mode. As discussed above, the power supply 100A, 100B can only operate in one of these two modes at any given time.

Figure 7:
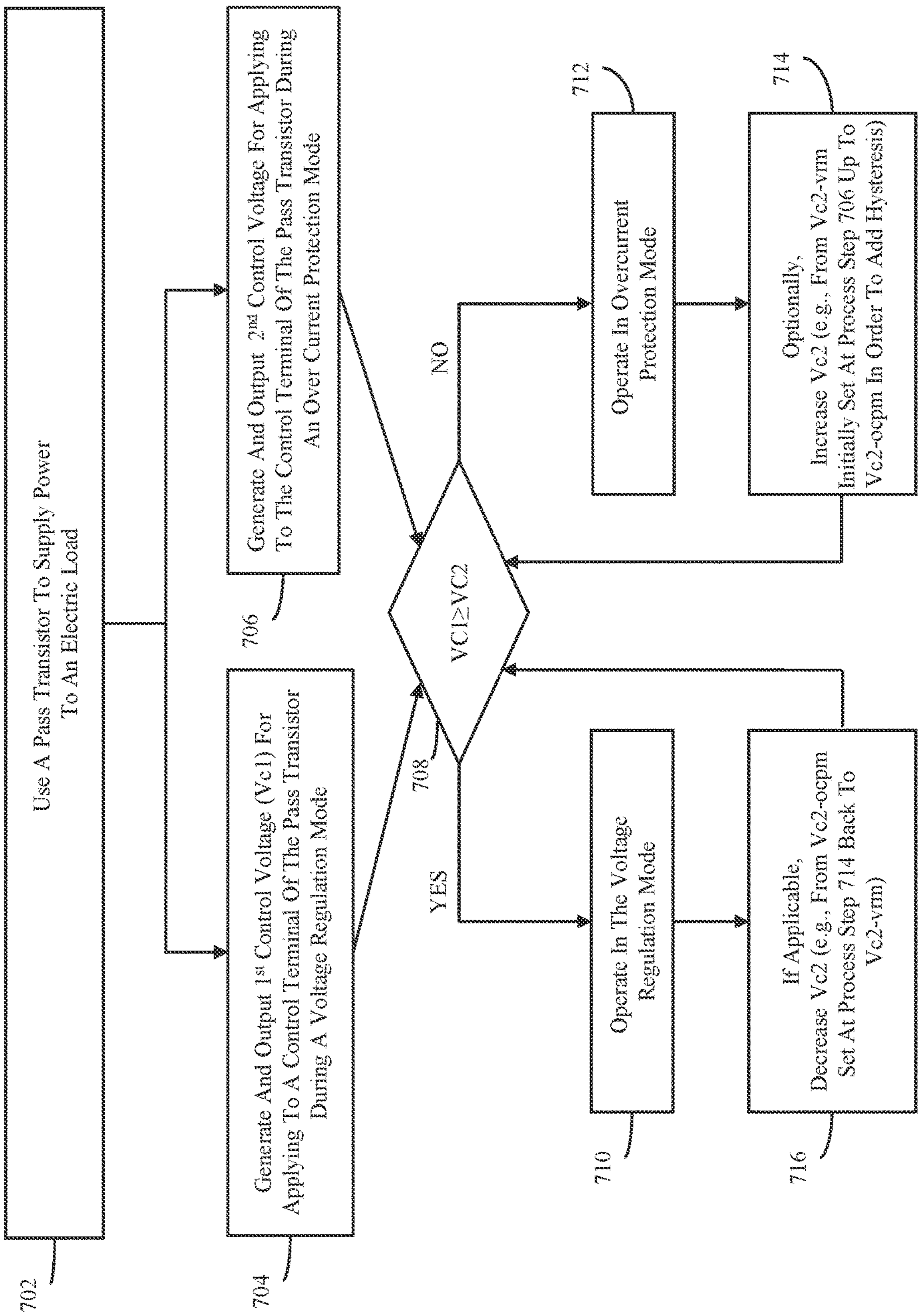
FIG. 7 is a flow diagram illustrating disclosed power supply method embodiments.

Referring to the flow diagram of FIG. 7, also disclosed herein are embodiments of a power supply method associated with the power supply structures described in detail above and illustrated generally in FIG. 1 and more specifically in FIGS. 2 and 3. The method can include supplying, by a pass transistor 110 of a power supply 100, power to an electrical load 125 (e.g., a variable electrical load) (see process step 702). As discussed above, the pass transistor 110 can have an input terminal 111 that is connected to an input voltage node 115 that receives an input voltage (Vin); an output terminal 112 connected to an output voltage node 116 that outputs an output voltage (Vout); and a control terminal 113.

The method can further include generating and outputting, by a voltage regulator 120 of the power supply 100, a first control voltage (Vc1) for applying to the control terminal 113 of the pass transistor 110 during a voltage regulation mode in order to maintain an output voltage (Vout) Vout at the output voltage node 116 at a desired voltage level (see process step 704). Vc1 can be variable and specifically generated given Vin and based on Vout.

The method can further include generating and outputting, by a current limiter 130 of the power supply 100, a second control voltage (Vc2) for applying to the control terminal 113 of the pass transistor 110 during an over current protection mode to prevent an output current (Iout) from rising above a maximum output current limit (Iout-max) of the pass transistor 110 (see process step 706).

The method can further include detecting when over current protection is required (e.g., due to excess load) and automatically switching operation between the voltage regulation mode and the over current protection mode (i.e., for automatically switching the control voltage applied to the control terminal from the first control voltage to the second control voltage or vice versa), as necessary (see process steps 708-712).

More specifically, the method can include comparing, by a comparator 141 of the power supply 100, Vc1 to Vc2 and outputting, by the comparator 141, a select signal (SEL) with a logic value that depends on the difference between Vc1 and Vc2 (see process step 708). The method can include further include, depending upon the logic value of SEL, selectively and automatically applying, by a switching circuit 140 of the power supply 100, either Vc1 to the control terminal 113 of the pass transistor 110 to initiate or maintain operation in the voltage regulation mode (see process step 710) or Vc2 to the control terminal 113 of the pass transistor 110 to initiate or maintain operation in the overcurrent protection mode (see process step 712). For example, if the SEL has a first logic value (e.g., a logic value of 1) indicating that over current protection is not required, then the method can include applying Vc1 from the voltage regulator 120 to the control terminal 113 of the pass transistor 110, either maintaining the power supply 100 in or switching the power supply 100 to the voltage regulation mode. Alternatively, if SEL has a second logic value (e.g., a logic value of 0) indicating that over current protection is required, then the method can include applying Vc2 from the current limiter 130 to the control terminal 113 of the pass transistor 110, maintaining the power supply 100 in or switching the power supply 100 to the over current protection mode.

Optionally, the method can include automatically adjusting Vc2 so that it is at a first voltage level during the voltage regulation mode and so that it is at a slightly different second voltage level during the over current protection mode in order to prevent continuous oscillation between the two modes. More specifically, as discussed above, Vc2 is generated and output at process step 706. However, if it is determined at process step 708 that Vc1 has dropped below Vc2, then the over current protection mode will be initiated at process step 712 and Vc2 will be applied to the control terminal 113 of the pass transistor. Vc1 will be repeatedly compared to Vc2 and Vc2 will continue to be applied to the control terminal of the pass transistor as long as Vc1 remains below Vc2. However, if Vc1 and Vc2 are approximately the same, the power supply could automatically switch back to the voltage regulation mode as soon as Vc2 is applied to the control terminal 113 of the pass transistor 110, automatically switch back to the over current protection mode as soon as Vc1 is applied to the control terminal 113, and so on. To prevent this continuous oscillation between the two modes (i.e., between process steps 710 and 712), the current level of Tref can be automatically decreased slightly from a first current level (Iref-vrm) to a second current level (Iref-ocpm) upon switching from the voltage regulation mode to the over current protection mode so that the voltage level of Vc2 is automatically increased slightly from a first voltage level (Vc2-vrm) to a second voltage level (Vc2-ocpm) (see process step 714). As a result, before switching from operation in the over current protection mode back to operation in the voltage regulation mode, for hysteresis Vc1 will have to be pulled up higher than it otherwise would. That is, Vc1 only has to drop below Vc2-vrm to cause the switch to operation in the over current protection mode, but it will have to rise to at least equal to Vc2-ocpm (i.e., Vc1≥Vc2-ocpm) to trigger the switch back to operation in the voltage regulation mode. Furthermore, the current level of Tref can be automatically increased slightly from Iref-ocpm back up to Iref-vrm upon switching from operation in the over current protection mode back to operation in the voltage regulation mode so that the voltage level of Vc2 is automatically decreased slightly from Vc2-ocpm back down to Vc2-vrm (see process step 716). See the detailed discussion above regarding operation of the variable Tref generation circuit 150A of the current limiter 130 of the power supply 100A of FIG. 2 or the variable Tref generation circuit 150A of the current limiter 130 of the power supply 100B of FIG. 3.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above are embodiments of a power supply, which has both an integrated voltage regulator and an integrated current limiter and which is configured to automatically switch between operating in a voltage regulation mode and an over current protection mode, as needed. These embodiments do not require the generation of a copy of Tout for over current protection, instead they employ a reference voltage and a mimicking transistor with the same current density as the pass transistor to generate to a mode-specific control voltage for applying to the control terminal of the pass transistor. As a result, matching is relatively easy, the quiescent current is constant across all electrical loads, there is low loss, and there is no need for fast loop correction. Furthermore, the configuration of the disclosed power supply offers a fast recovery from the over current protection mode back to the voltage regulation mode because start-up of the voltage regulator is not required. Instead, the voltage regulator continuously generates Vc1, and the current limiter continuously generates Vc2 and switching between the two modes (i.e., switching between application of Vc1 to the control terminal of the pass transistor and application of Vc2 to the control terminal of the pass transistor) is dynamic, simply dependent upon on the relationship between Vc1 and Vc2.

What is claimed is:

1. A structure comprising:

a pass transistor having a control terminal and an output terminal, wherein the output terminal is connected to an output voltage node;

a comparator adapted to compare a first control voltage to a second control voltage and to output a select signal based on a difference between the first control voltage and the second control voltage, wherein the first control voltage is dependent on an output voltage at the output voltage node; and a switching circuit adapted to apply one of the first control voltage and the second control voltage to the control terminal based on the select signal.

2. The structure of claim 1, wherein the pass transistor has a maximum output current limit, wherein the comparator and the switching circuit are configured to enable automatic switching of control of operation of the pass transistor from the first control voltage to the second control voltage, wherein, as long as an output current from the pass transistor is less than the maximum output current limit, the first control voltage controls operation of the pass transistor to regulate the output voltage at the output voltage node, and wherein, when the output current reaches the maximum output current limit, the second control voltage controls operation of the pass transistor to prevent the maximum output current limit from being exceeded.

3. The structure of claim 1, wherein the pass transistor comprises any of a p-type field effect transistor and a pnp bipolar junction transistor and the voltage regulator comprises a low-dropout voltage regulator.

4. The structure of claim 1, further comprising a voltage regulator, wherein the voltage regulator includes:

a pair of resistors connected in series between the output voltage node and ground; and an error amplifier comprising: a non-inverting input connected to a feedback voltage node between the pair of resistors; and an inverting input that receives a first reference voltage; and an output connected to the comparator and to the switching circuit, wherein the error amplifier is configured to output the first control voltage based on a difference between a feedback voltage at the feedback voltage node and the first reference voltage.

5. The structure of claim 1, further comprising:

an input voltage node, wherein the pass transistor further includes an input terminal connected to the input voltage node; and a current limiter, wherein the current limiter includes:

a mimic output voltage node;

a mimicking transistor comprising: an input terminal connected to the input voltage node; an output terminal connected to the mimic output voltage node; and a control terminal; and a feedback amplifier comprising: a non-inverting input connected to the mimic output voltage node; an inverting input that receives a second reference voltage; and an output connected to the control terminal of the mimicking transistor, to the comparator, and to the switching circuit, wherein the feedback amplifier is configured to output the second control voltage based on a difference between a mimic output voltage at the mimic output voltage node and the second reference voltage.

6. The structure of claim 5, wherein the current limiter further comprises a variable reference current generation circuit, and wherein the variable reference current generation circuit is configured to automatically adjust a reference current across the mimic output voltage node so that, during a voltage regulation mode, the reference current is at a first current level causing the second control voltage to be at a first voltage level and so that, during an over current protection mode, the reference current is at a second current level causing the second control voltage to be at a second voltage level that is different from the first voltage level.

7. A structure comprising:

a pass transistor having a control terminal and an output terminal, wherein the output terminal is connected to an output voltage node;

a comparator adapted to compare a first control voltage to a second control voltage and to output a select signal based on a difference between the first control voltage and the second control voltage, wherein the first control voltage is dependent on an output voltage at the output node and wherein the select signal has a first logic value when the first control voltage is greater than the second control voltage and a second logic value when the first control voltage is less than the second control voltage; and a switching circuit adapted to apply the first control voltage to the control terminal of the pass transistor when the select signal has the first logic value and to further apply the second control voltage to the control terminal of the pass transistor when the select signal has the second logic value.

8. The structure of claim 7, wherein the pass transistor has a maximum output current limit, wherein the comparator and the switching circuit are configured to enable automatic switching of control of operation of the pass transistor from the first control voltage to the second control voltage, wherein, as long as an output current from the pass transistor is less than the maximum output current limit, the first control voltage controls operation of the pass transistor to regulate the output voltage at the output voltage node, and wherein, when the output current of the pass transistor reaches the maximum output current limit, the second control voltage controls operation of the pass transistor to prevent the maximum output current limit from being exceeded.

9. The structure of claim 7, wherein the pass transistor comprises any of a p-type field effect transistor and a pnp bipolar junction transistor and wherein the voltage regulator comprises a low-dropout voltage regulator.

10. The structure of claim 7, further comprising a voltage regulator, wherein the voltage regulator includes:

a pair of resistors connected in series between the output voltage node and ground; and an error amplifier comprising: a non-inverting input connected to a feedback voltage node between the pair of resistors; an inverting input that receives a first reference voltage; and an output connected to the comparator and to the switching circuit, wherein the error amplifier is configured to output the first control voltage based on a difference between a feedback voltage at the feedback voltage node and the first reference voltage.

11. The structure of claim 7, further comprising:

an input voltage node, wherein the pass transistor further includes an inputer terminal connected to the input voltage node; and a current limiter including:

a mimic output voltage node;

a mimicking transistor comprising: an input terminal connected to the input voltage node; an output terminal connected to the mimic output voltage node; and a control terminal; and a feedback amplifier comprising: a non-inverting input connected to the mimic output voltage node; an inverting input that receives a second reference voltage; and an output connected to the control terminal of the mimicking transistor, to the comparator, and to the switching circuit, wherein the feedback amplifier is configured to output the second control voltage based on a difference between a mimic output voltage at the mimic output voltage node and the second reference voltage.

12. The structure of claim 11, wherein the current limiter further comprises a variable reference current generation circuit, and wherein the variable reference current generation circuit is configured to automatically adjust a reference current across the mimic output voltage node so that, during a voltage regulation mode, the reference current is at a first current level causing the second control voltage to be at a first voltage level and so that, during an over current protection mode, the reference current is at a second current level causing the second control voltage to be at a second voltage level that is different from the first voltage level.

13. The structure of claim 12, wherein the first logic value of the select signal is 1 and the second logic value of the select signal is 0, wherein the variable reference current generation circuit comprises:

a resistor connected to the mimic output voltage node;

an additional resistor connected in series between the resistor and ground; and a field effect transistor connected in parallel with the additional resistor and further connected in series between the resistor and ground, and wherein the field effect transistor has a gate controlled by the select signal.

14. The structure of claim 12, wherein the first logic value of the select signal is 1 and the second logic value of the select signal is 0, wherein the variable reference current generation circuit comprises:

a current source connected between the mimic output voltage node and ground;

an additional current source connected to the mimic output voltage node; and a field effect transistor connected in series between the additional current source and ground, and wherein the field effect transistor has a gate controlled by the select signal.

15. The structure of claim 11, wherein the first logic value of the select signal is 1 and the second logic value of the select signal is 0, and wherein the switching circuit comprises:

a first inverter and a second inverter connect in series, wherein the first inverter receives the select signal from the comparator;

a first switch; and a second switch, wherein the second switch receives an inverted select signal from the first inverter and, based on the inverted select signal, either connects the current limiter to the control terminal of the pass transistor or disconnects the current limiter from the control terminal of the pass transistor, and wherein the first switch receives a twice-inverted select signal from the second inverter and, based on the twice-inverted select signal, either connects the voltage regulator to the control terminal of the pass transistor or disconnects the voltage regulator from the control terminal of the pass transistor.

16. The structure of claim 15, wherein the first switch and the second switch each comprise: a p-type field effect transistor and an n-type field effect transistor connected in parallel between input and output nodes; and an additional inverter connected to a gate of the p-type field effect transistor, wherein, in the first switch, the twice-inverted select signal is applied to the additional inverter and to a gate of the n-type field effect transistor, and wherein, in the second switch, the inverted select signal is applied to the additional inverter and to a gate of the n-type field effect transistor.

17. A method comprising:

comparing, by a comparator of a power supply, a first control voltage to a second control voltage and outputting, by the comparator, a select signal based on a difference between the first control voltage and the second control voltage, wherein the first control voltage is dependent on an output voltage at an output node connected to an output terminal of a pass transistor; and applying, by a switching circuit of the power supply based on the select signal, one of the first control voltage and the second control voltage to a control terminal of the pass transistor.

18. The method of claim 17, wherein the pass transistor has a maximum output current limit, wherein the outputting of the select signal and the applying of the one of the first control voltage and the second control voltage to the control terminal of the pass transistor based on the select signal enables automatic switching of control of operation of the pass transistor from the first control voltage to the second control voltage, wherein, as long as an output current from the pass transistor is less than the maximum output current limit, the first control voltage controls operation of the pass transistor to regulate the output voltage at the output voltage node, and wherein, when the output current reaches the maximum output current limit, the second control voltage controls operation of the pass transistor to prevent the maximum output current limit from being exceeded.

19. The method of claim 17, further comprising generating, by a voltage regulator of the power supply, the first control voltage based on the output voltage, wherein the voltage regulator comprises a low-dropout voltage regulator.

20. The method of claim 17, further comprising automatically setting the second control voltage at a first voltage level during a voltage regulation mode and at a second voltage level that is different from the first voltage level during an over current protection mode.

* * * * *